(12) United States Patent
Yang

(10) Patent No.: US 8,462,642 B2
(45) Date of Patent: Jun. 11, 2013

(54) METHOD OF ANALYSIS FOR INTERNET TELEPHONE QUALITY AND ITS INTERFERENCE

(75) Inventor: Sun Joo Yang, Seoul (KR)

(73) Assignee: Newbroad Technologies Inc., Yatap-Dong, Bundang-Gu, Seongnam, Kyunggi-Do (KR)

( * ) Notice: Subject to any disclaimer, the term of this patent is extended or adjusted under 35 U.S.C. 154(b) by 90 days.

(21) Appl. No.: 12/998,590

(22) PCT Filed: Aug. 12, 2009

(86) PCT No.: PCT/KR2009/004513
§ 371 (c)(1), (2), (4) Date: May 5, 2011

(87) PCT Pub. No.: WO2010/064771
PCT Pub. Date: Jun. 10, 2010

(65) Prior Publication Data
US 2011/0243001 A1 Oct. 6, 2011

(30) Foreign Application Priority Data
Dec. 5, 2008 (KR) ........................ 10-2008-0123193

(51) Int. Cl.
H04L 12/26 (2006.01)
H04L 12/66 (2006.01)

(52) U.S. Cl.
USPC .......................................... 370/249; 370/352

(58) Field of Classification Search
USPC .................................................. 370/241–253
See application file for complete search history.

(56) References Cited

U.S. PATENT DOCUMENTS

| | | | |
|---|---|---|---|
| 2003/0093513 A1* | 5/2003 | Hicks et al. ................... | 709/224 |
| 2003/0185210 A1* | 10/2003 | McCormack ................. | 370/392 |
| 2004/0064760 A1* | 4/2004 | Hicks et al. ..................... | 714/43 |
| 2004/0193709 A1* | 9/2004 | Selvaggi et al. .............. | 709/224 |
| 2005/0135392 A1* | 6/2005 | Burns et al. ................... | 370/401 |
| 2006/0104207 A1* | 5/2006 | Ostrosky ........................ | 370/241 |
| 2007/0104105 A1* | 5/2007 | MeLampy et al. ............ | 370/235 |
| 2009/0161565 A1* | 6/2009 | Reniere et al. ................ | 370/249 |

OTHER PUBLICATIONS

Edited by Gillian M. Davis, Noise Reduction in Speech Applications, CRC Press 2002, Print ISBN: 978-0-8493-0949-6, Chapter 11—p. 5: Figure 11.2.*

* cited by examiner

*Primary Examiner* — Derrick Ferris
*Assistant Examiner* — Joe Combs
(74) *Attorney, Agent, or Firm* — GWIPS

(57) ABSTRACT

A method for analyzing Internet telephone quality and interference has developed that two-way voice and video quality between IP phones and a measurement instrument measures in real time along the actual communication path using loopback functions of the IP phones. When interference is detected, the interference source location is identified by checking whether the interference has occurred in the internal section of the IP phones or in the IP network section on the basis of loopback results of the IP phones and ping and trace route analysis in a section-based manner.

1 Claim, 5 Drawing Sheets

METHOD OF ANALYSIS FOR INTERNET TELEPHONE QUALITY AND ITS INTERFERENCE

BACKGROUND OF THE INVENTION

1. Field of the Invention

The present invention relates to a method for analyzing Internet telephone quality and its interference. More particularly, an analyzing method for Internet telephone quality and its interference, wherein two-way voice and video quality between IP phones and a measurement instrument is measured using loopback mode of the IP phones and the quality measurement result is delivered to users of the IP phones in a form of audible sound, and, when interference is detected, the internal section of the IP phones and the IP network section are separately analyzed to find the trouble source.

2. Related Prior Art

In recent years, IP phones that deliver voice and video calls through the Internet have been rapidly popularized.

Unlike standard telephones using public switched telephone networks (PSTN) based on circuit switching, IP phones use IP networks based on IP addresses.

IP phones may be divided into wired VoIP (Voice over Internet Protocol) phones and wireless Wi-Fi (wireless fidelity) phones. Reduction in network investment costs due to integration of telephone networks and data networks, reduction in management costs and increase in efficiency owing to construction of integrated networks, and easy adoption of Internet-based multimedia services such as video conferencing are expected to rapidly increase the number of IP phones in the near future.

Unlike the PSTN using dedicated lines, IP networks using flexible lines may experience high packet loss and significant delay depending upon network traffic. In comparison to PSTN telephony, IP telephony tends to be poor in quality of service (QoS) and hence needs more accurate QoS measurement.

That is, VoIP services requiring strict real-time properties may experience significant quality degradation owing to real-time limitations of IP networks. Hence, it is necessary for VoIP service providers to continuously perform quality measurement and interference analysis to resolve customer dissatisfaction due to quality degradation in voice communication and to ensure an effective level of voice communication quality for customers.

As part of an effort to ensure IP telephony quality, in an existing passive monitoring scheme, a monitoring server is installed at a site where a quality problem has occurred or in the middle of the communication path to measure quality and analyze interferences.

More specifically, as shown in FIG. 1, assume that a first IP phone 10 is conversing with a second IP phone 20 through SBC 11a, IP-PBX 12a, IP network 15, SBC 11b and IP-PBX 12b. When a passive monitoring server 16 is installed between the first IP phone 10 and the second IP phone 20 (not at a site where a quality problem has occurred), as quality in between the users is measured (not end-to-end quality), measured quality may differ from the quality perceived by the users. In addition, as the passive monitoring server 16 monitors all data passing through the IP network 15, when a large amount of traffic of many users passes there through, the passive monitoring server 16 may have difficulty in conducting accurate quality measurement and interference analysis owing to heavy load.

As part of an effort to ensure IP telephony quality, in an existing active monitoring scheme, data is sent from a site where a quality problem has occurred to a measurement server and quality measurement and interference analysis are performed on the basis of the amount of damage to the data.

More specifically, as shown in FIG. 2, assume that a first IP phone 30 is conversing with a second IP phone 40 through SBC 31a, IP-PBX 32a, IP network 35, SBC 31b and IP-PBX 32b. When a call originates from a site where quality interference has occurred to an active monitoring server 36 and the active monitoring server 36 measures quality of the call, call quality may be measured only in one direction from the IP phone to the active monitoring server 36 and human intervention may be required to originate a call to the active monitoring server 36. In addition, as measurement and analysis are performed after the time needed for installation from the interference occurrence time, it is difficult to measure and analyze problematic situations in real time.

SUMMARY OF THE INVENTION

The present invention is conceived to solve the above problems, and one aspect of the present invention is to provide a method for analyzing quality and quality interference in Internet telephony that measures two-way voice and video quality between IP phones and a measurement instrument using loopback mode of the IP phones, delivers the quality measurement result to users of the IP phones in the form of audible sound, and, when quality interference is detected, separately analyzes the internal section of the IP phones and the IP network section to determine the interference location.

In accordance with one aspect of the invention, a method for quality measurement and quality interference analysis in Internet telephony includes: (A) making, by a measurement instrument 250, a call to a first IP phone 200a, or making, by the first IP phone 200a, a call to the measurement instrument 250 (S310); (B) determining the direction of the call between the measurement instrument 250 and the first IP phone 200a (S320); (C) responding to, by the measurement instrument 250 when the measurement instrument 250 receives the call from the first IP phone 200a, the call from the first IP phone 200a (S325); (D) automatically responding to, by the first IP phone 200a when the first IP phone 200a receives the call from the measurement instrument 250, the call from the measurement instrument 250 using an automatic response unit 207, sending a packet containing an IP address of the first IP phone 200a to the measurement instrument 250, and looping back voice and video data received from the measurement instrument 250 to the measurement instrument 250 through an IP data loopback means 204 (S330); (E) measuring, by the measurement instrument 250 when data received from the first IP phone 200a is looped-back data (S340), two-way quality by comparing the looped-back voice and video data from the first IP phone 200a with the originally sent data and analyzing RTP packets 242 and RTCP packets 244 received over an IP network 240 (S350); and (F) obtaining, by the measurement instrument 250, the IP address of the first IP phone 200a from the packet containing the IP address of the first IP phone 200a, or obtaining, when the first IP phone 200a is connected to a private network, an IP address of an IP sharing device 220a or a hub connected to the private network (S355).

The method may further include (G) identifying, when quality interference is detected in (E) of two-way quality measurement, a interference location by determining whether the interference has occurred on the IP network 240 through first stage loopback between a jitter buffer 201 and the IP network 240, determining, when the interference is not detected through first stage loopback, whether the interference has occurred at the jitter buffer 201 through second stage loopback between the jitter buffer 201 and a DSP codec 203, and checking, when the interference is not detected through second stage loopback, interference occurrence through third stage loopback between the DSP codec 203 and a POTS network 205, and performing, when the interference is determined to have occurred on the IP network 240, quality and interference analysis for the section of the IP network 240 by pinging and trace routing to the IP address obtained at (F) (S357).

According to the method for analyzing quality and quality interference in Internet telephony, two-way voice and video quality between IP phones and a measurement instrument may be measured in real time using loopback mode of the IP phones along the actual communication path. In particular, when quality interference is detected, it is possible to determine whether the quality interference has occurred in the internal section of the IP phones or in the IP network section on the basis of loopback results of the IP phones and ping and trace route analysis in a section-based manner.

As the quality measurement result is reported to the user in the form of audible sound, the user may be aware of uplink quality of IP phone calls without the need for a separate instrument.

In addition, thanks to the automatic response function of the IP phone capable of recognizing a call from the measurement instrument, it is possible to measure the call hit ratio and quality of IP telephony without human intervention.

DETAILED DESCRIPTION OF THE PREFERRED EMBODIMENTS

Hereinafter, a method for IP telephony quality measurement of the present invention will be described in detail with reference to the accompanying drawings.

First, a description is given of a system employed for the method for IP telephony quality and interference analysis of the present invention.

Figure 1:
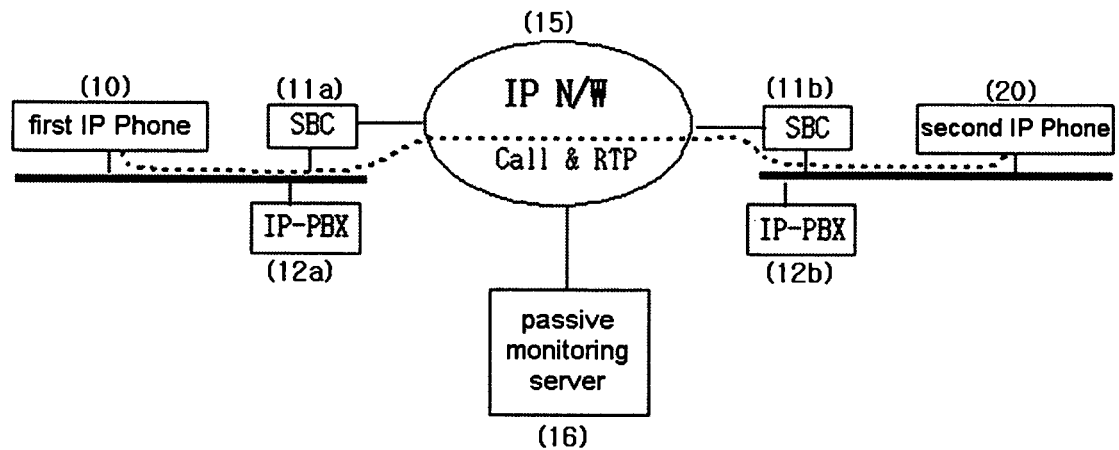
FIG. 1 illustrates a related art method for analyzing IP telephony quality and interference.
Figure 2:
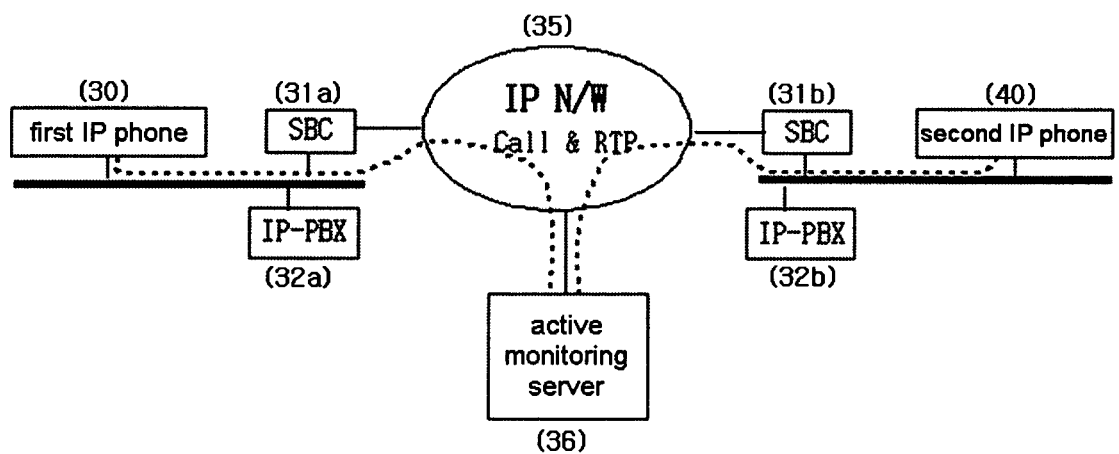
FIG. 2 illustrates another related art method for analyzing IP telephony quality and interference.
Figure 3:
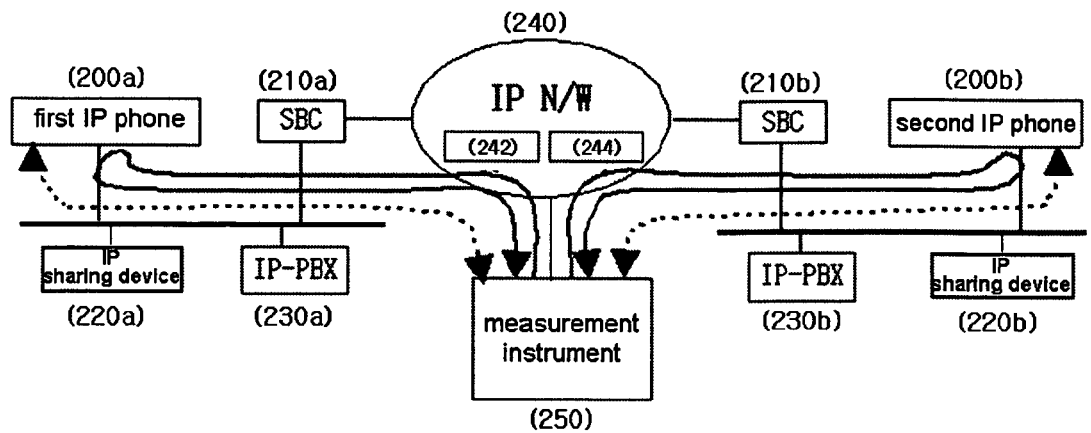
FIG. 3 illustrates a system configuration depicting a method for IP telephony quality and interference analysis according to an exemplary embodiment of the present invention.
Figure 4:
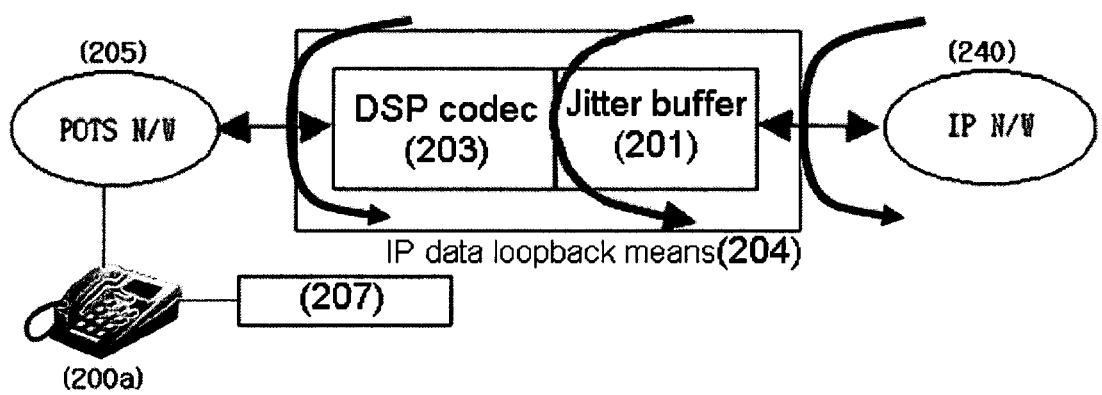
FIG. 4 illustrates the configuration of an IP phone used in the present invention.
Figure 5:
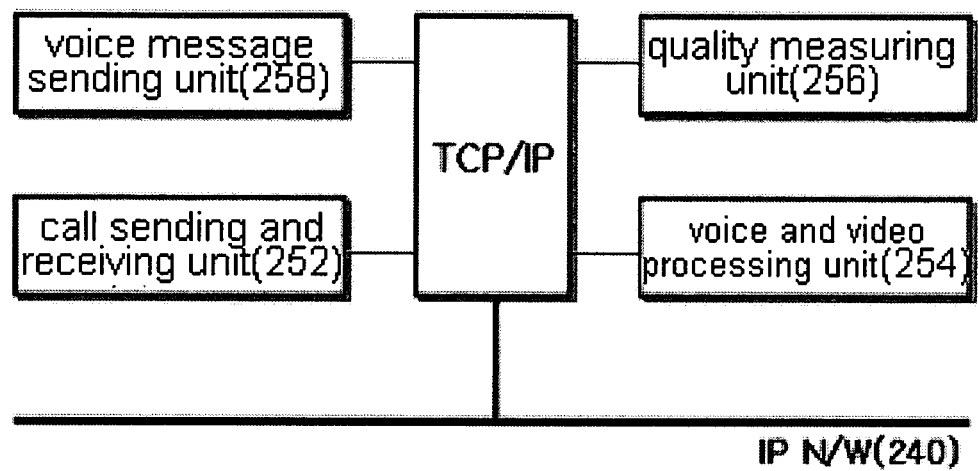
FIG. 5 illustrates the configuration of a measurement instrument used in the present invention.

FIG. 3 illustrates a system configuration depicting a method for IP telephony quality and interference analysis according to an embodiment of the present invention, FIG. 4 illustrates the configuration of an IP phone used in the present invention, and FIG. 5 illustrates the configuration of a measurement instrument used in the present invention.

As shown in FIGS. 3 to 5, the system, which implements the method for IP telephony quality and interference analysis according to an embodiment of the present invention, includes a first IP phone 200a, a second IP phone 200b, session border controllers 210a and 210b, IP sharing devices 220a and 220b, IP private branch exchanges 230a and 230b, an IP network 240 and a measurement instrument 250.

Specifically, the first IP phone 200a and the second IP phone 200b send and receive multimedia data such as voice and video data through the IP network 240.

As shown in FIG. 4, each of the first IP phone 200a and the second IP phone 200b includes a jitter buffer 201 for temporarily buffering IP data such as voice and video data received through the IP network 240 from the measurement instrument 250, a DSP codec 203 for compressing and decompressing the IP data from the jitter buffer 201, a POTS network 205 receiving the data compressed and decompressed by the DSP (Digital Signal Processor) codec 203, and an automatic response unit 207 for automatically responding to a call coming from the measurement instrument 250 through the IP network 240.

The jitter buffer 201 and the DSP codec 203 constitute an IP data loopback means 204 that sends voice and video data received from the measurement instrument 250 back to the measurement instrument 250. As shown in FIG. 4, first stage IP data loopback is performed between the jitter buffer 201 and the IP network 240, second stage IP data loopback is performed between the jitter buffer 201 and the DSP codec 203, and third stage IP data loopback is performed between the DSP codec 203 and the POTS network 205. Loopback is preferably performed at a point near to the POTS network 205 (third stage loopback) in order to loop back a signal, which is nearly identical to a signal sent to the first IP phone 200a or the second IP phone 200b, to the measurement instrument 250.

Each of the session border controllers (SBC) 210a and 210b converts signaling data and media data transmitted between the first IP phone 200a and the second IP phone 200b, and acts as a private network interface.

When the first IP phone 200a and the second IP phone 200b are connected to private networks, the IP sharing devices 220a and 220b assign private IP addresses respectively to the first IP phone 200a and the second IP phone 200b and connect the first IP phone 200a and the second IP phone 200b respectively to the public network.

The IP private branch exchanges (IP-PBX) 230a and 230b act as IP telephony exchanges and conduct PSTN and PBX interworking functions.

The IP network 240 connects the first IP phone 200a and the second IP phone 200b for communication so that the first IP phone 200a and the second IP phone 200b may send and receive multimedia data such as voice and video data.

The IP network 240 includes RTP (Real-time Transport Protocol) packets 242 to transport multimedia data such as voice and video data between the first IP phone 200a and the second IP phone 200b, and RTCP (Real-time Transport control Protocol) packets 244 to control the RTP packets 242.

The measurement instrument 250 measures quality for the first IP phone 200a and the second IP phone 200b using IP data loopback mode (solid arrows in FIG. 3) and interactive voice response (IVR) mode (dotted arrows in FIG. 3).

The measurement instrument 250 includes a call sending and receiving unit 252 for placing and receiving calls to and from the first IP phone 200a and the second IP phone 200b, a voice and video processing unit 254 for processing multimedia data such as voice and video data received from the first IP phone 200a and the second IP phone 200b, a quality measuring unit 256 for measuring quality values including mean opinion scores (MOS, subjective evaluation scheme using voices), and delay, loss and jitter values, and a voice message sending unit 258 for notifying the first IP phone 200a and the second IP phone 200b of the quality values including MOS and delay, loss and jitter values obtained by the quality measuring unit 256 as audible sound.

Figure 6:
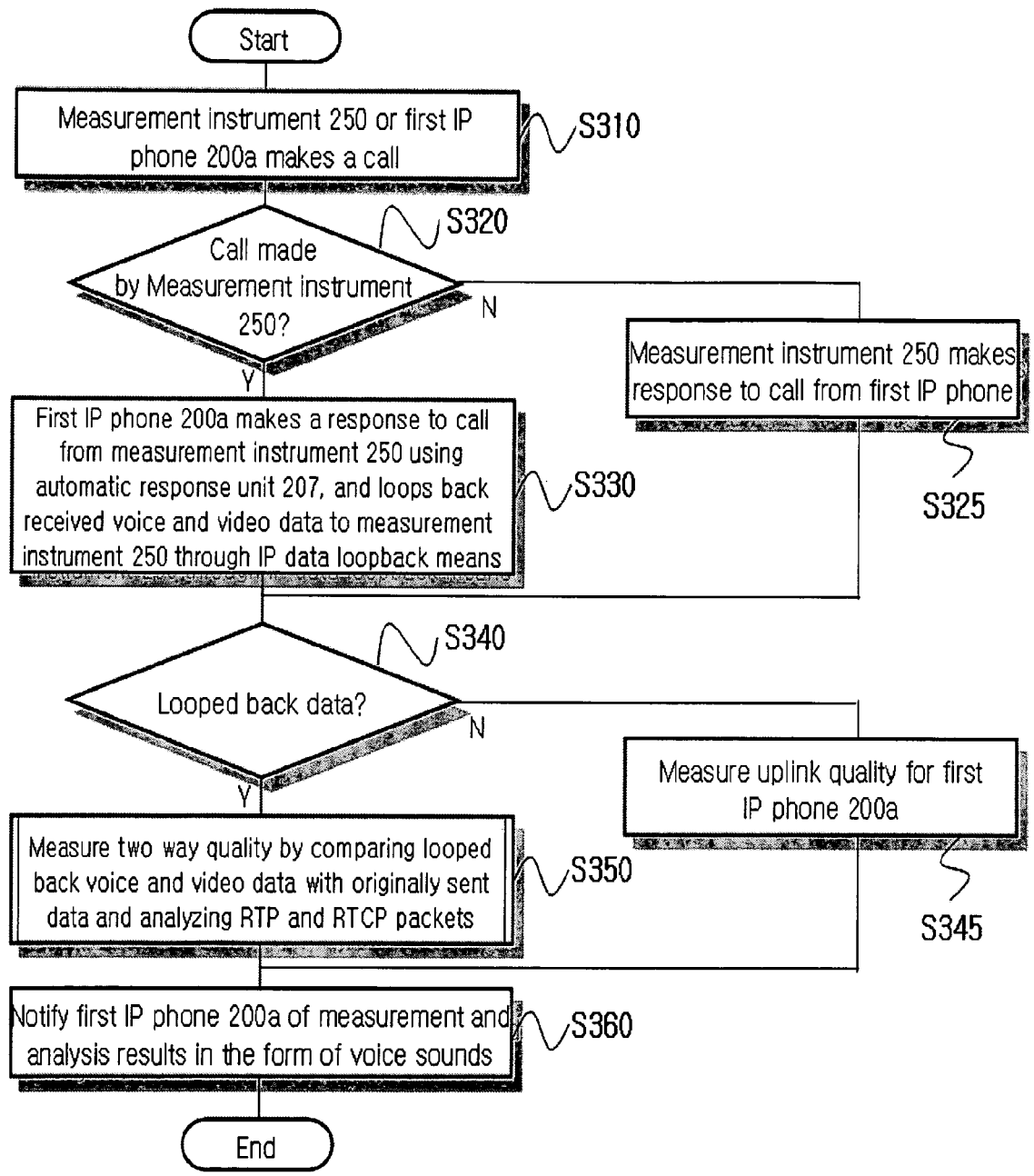
FIG. 6 is a flowchart of a method for IP telephony quality and interference analysis according to another exemplary embodiment of the present invention.
Figure 7:
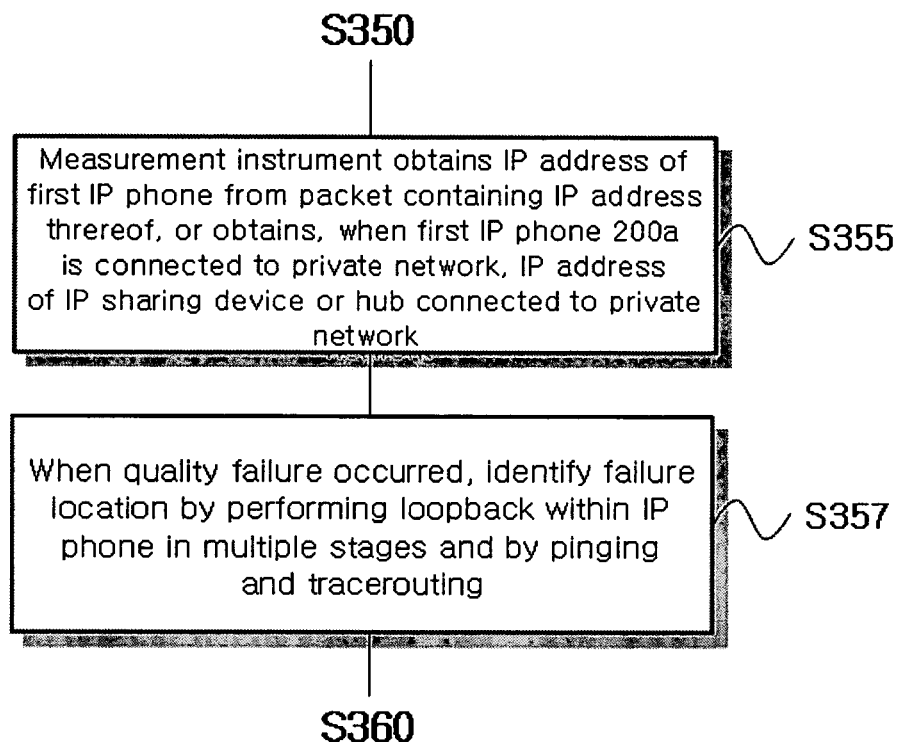
FIG. 7 is a flowchart depicting subroutines of step S350 in FIG. 6.

Next, a description is given of a method for IP telephony quality and interference analysis of the present invention in connection with FIGS. 6 and 7. As the same analysis procedure is applied both between the first IP phone 200a and the IP network 240 and between the second IP phone 200b and the IP network 240, the method is described using only the first IP phone 200a, the IP network 240 and the measurement instrument 250.

FIG. 6 is a flowchart of a method for IP telephony quality and interference analysis according to the present invention, and FIG. 7 depicts subroutines of step S350 in FIG. 6.

Referring to FIG. 6, when a problem occurs during an IP phone call, the measurement instrument 250 makes a call to the first IP phone 200a or the first IP phone 200a makes a call to the measurement instrument 250 (S310).

The measurement instrument 250 and the first IP phone 200a determine the direction of the call (S320).

When the first IP phone 200a has made the call to the measurement instrument 250, the measurement instrument 250 responds to the call (S325).

When the measurement instrument 250 has made the call to the first IP phone 200a, the first IP phone 200a automatically responds to the call using the automatic response unit 207, sends a packet containing the IP address of the first IP phone 200a to the measurement instrument 250, and loops back voice and video data received from the measurement instrument 250 to the measurement instrument 250 through the IP data loopback means 204 (S330).

The measurement instrument 250 determines whether data received from the first IP phone 200a is looped-back data (S340).

When the received data is not looped-back data, the measurement instrument 250 measures uplink quality in terms of jitter, delay and loss for the first IP phone 200a using RTP packets 242 and RTCP packets 244 related to voice and video data received from the first IP phone 200a (S345).

Here, although IP telephony quality may depend on various factors, as factors unrelated to properties of the IP network 240 have fixed values, IP telephony quality is actually determined by the quality of the IP network 240. The quality of the IP network 240 may be represented in terms of delay, loss and jitter. Jitter generated by variations in delay may be converted into delay and loss after processing at the jitter buffer 201 of the first IP phone 200a.

Hence, the IP telephony quality may be represented by a function of loss and delay up to the jitter buffer 201 as in Equation 1 below.

$$\text{Quality in IP telephony (QoS)} = f(D/L) \quad \text{[Equation 1]}$$

where D indicates call loss up to the jitter buffer 201, L indicates call delay (latency) up to the jitter buffer 201, and f indicates a function.

Specifically, using data carried by RTP packets 242 and RTCP packets 244 from the first IP phone 200a to the measurement instrument 250, the loss value may be measured by analysis of increasing sequence numbers in RTP packets 242, the jitter value may be measured by analysis of time intervals between RTP packets 242, and the delay value may be measured by analysis of RTCP packets 244.

When the received data is looped-back data, the measurement instrument 250 measures uplink quality using RTP packets 242 and RTCP packets 244 received from the first IP phone 200a, and computes two-way quality by comparing the looped-back voice and video data with the originally sent data and analyzing RTP packets 242 and RTCP packets 244 transmitted over the IP network 240 (S350).

In step S350, the measurement instrument 250 obtains the IP address of the first IP phone 200a from a packet containing the IP address thereof or obtains, when the first IP phone 200a is connected to a private network, the IP address of the IP sharing device 220a or a hub connected to the private network (S355).

When quality interference is detected at step S355, the measurement instrument 250 identifies the interference location by performing loopback in three stages and pinging and traces routing to the IP address obtained at step S355 (S357).

Here, ping is a utility for testing whether a packet reaches a specific destination on the IP network, and trace route is a utility for identifying the path of a packet travelling to a destination on the IP network.

At step S357, when interference is detected by loopback between the jitter buffer 201 and the IP network 240 (first stage), the interference is determined to be a interference in the IP network 240; when a interference is detected by loopback between the jitter buffer 201 and the DSP codec 203 without a interference in the first stage (second stage), the interference is determined to be a interference at the jitter buffer 201; and when no interference is detected by the second stage loopback, loopback is performed between the DSP codec 203 and the POTS network 205 (third stage). In addition, when the interference is determined to be a interference in the IP network 240, pinging and trace routing are performed to the IP address obtained at step S355 to determine the interference location on the IP network 240.

Accordingly, when quality interference occurs, it is possible to identify the interference location through steps S355 and S357.

Thereafter, the measurement instrument 250 notifies the first IP phone 200a of the measurement results including jitter, delay and loss values in the form of audible sound (S360).

Next, a description is given of a scheme for computing two-way quality between the measurement instrument 250 and the first IP phone 200a at step S350.

To compute the quality in the direction from the measurement instrument 250 to the first IP phone 200a, it is necessary to obtain the loss and delay values up to the jitter buffer 201 as illustrated in Equation 1.

The loopback delay (Tloop) in the direction from the measurement instrument 250 to the first IP phone 200a is given by Equation 2.

$$Tloop = To + Tj + Ti \quad \text{[Equation 2]}$$

where To indicates transmission delay from the measurement instrument 250 to the first IP phone 200a, Tj indicates delay for passing through the jitter buffer 201 of the first IP phone 200a, and Ti indicates transmission delay from the first IP phone 200a to the measurement instrument 250.

The loopback delay (Tloop) may be computed by comparing the time at which the measurement instrument 250 has sent data to the first IP phone 200a with the time at which the looped back data is received. The transmission delay (Ti) from the first IP phone 200a to the measurement instrument 250 may be obtained by analysis of RTCP data. Hence, the delay up to the jitter buffer 201 of the first IP phone 200a (To+Tj) may be computed.

The loopback loss (Lloop) in the direction from the measurement instrument 250 to the first IP phone 200a is given by Equation 3.

$$Lloop = Lo + Li + Lj \quad \text{[Equation 3]}$$

where Lo indicates transmission loss from the measurement instrument 250 to the first IP phone 200a, Li indicates transmission loss from the first IP phone 200a to the measurement instrument 250, and Lj indicates loss for passing through the jitter buffer 201 of the first IP phone 200a.

The loopback loss (Lloop) may be computed by comparing the data sent by the measurement instrument 250 to the first IP phone 200a with the looped back data. The transmission loss (Li) from the first IP phone 200a to the measurement instrument 250 may be obtained by analysis of sequence numbers in received RTP packets 242. Hence, the loss up to the jitter buffer 201 of the first IP phone 200a (Lo+Lj) may be computed.

As To+Tj and Lo+Lj indicate the delay and the loss up to the jitter buffer 201 of the first IP phone 200a, respectively, the quality in the direction from the measurement instrument 250 to the first IP phone 200a may be computed.

On the other hand, when IP data loopback is performed between the IP network 240 and the jitter buffer 201 of the first IP phone 200a without passing through the jitter buffer 201 so that IP data including the RTP header sent by the measurement instrument 250 is looped back to the measurement instrument 250 without modification, Equation 4 holds.

$$Tloop = To + Ti$$

$$Lloop = Lo + Li$$

$$Jloop = Jo + Ji \quad \text{[Equation 4]}$$

where Jloop indicates the loopback jitter, Jo indicates jitter from the measurement instrument 250 to the first IP phone 200a, and Ji indicates jitter from the first IP phone 200a to the measurement instrument 250.

Hence, the measurement instrument 250 may measure total delay, loss and jitter for the loopback section by comparing data sent to the first IP phone 200a with data received from the first IP phone 200a to thereby compute the quality for the loopback section.

Here, when the RTP header of looped-back IP data is newly created, as values Li and Ji can be obtained from the RTP header, values To, Lo and Jo can be obtained using measured values Tloop, Lloop and Jloop. Hence, two-way quality may be obtained using Equation 1. As two-way quality is related to loopback immediately after the IP network 240, the quality for the IP network section may be obtained therefrom.

In the case of using regular calls not in loopback mode, the quality measured in the direction from the first IP phone 200a to the measurement instrument 250 may be used together with difference analysis to predict the quality in the direction from the measurement instrument 250 to the first IP phone 200a.

Although some embodiments have been described herein, it should be understood by those skilled in the art that various modifications, changes, and alterations can be made without departing from the spirit and scope of the invention. Therefore, the scope of the invention should be limited only by the accompanying claims and equivalents thereof.

What is claimed is:

1. A method of analysis for measuring Internet telephone quality and interference, the method comprising the steps of:

making a call to a first Internet Protocol (IP) phone (200a) by a measurement instrument (250), or making a call to the measurement instrument (250) by the first IP phone (200a), determining the direction of the call between the measurement instrument (250) and the first IP phone (200a), responding to the call from the first IP phone (200a) by the measurement instrument (250) when the measurement instrument (250) receives the call from the first IP phone (200a), automatically responding to the call from the measurement instrument (250) using an automatic response unit (207) by the first IP phone (200a) when the first IP phone (200a) receives the call from the measurement instrument (250), sending a packet containing an IP address of the first IP phone (200a) to the measurement instrument (250), and looping back voice and video data received from the measurement instrument (250) to the measurement instrument (250) through an IP data loopback means (204), measuring two-way quality by the measurement instrument (250) when data received from the first IP phone (200a) is looped-back data, comparing the looped-back voice and video data from the first IP phone (200a) with the originally sent data and analyzing Real-time Transport Protocol (RTP) packets (242) and Real-time Transport control Protocol (RTCP) packets (244) received over an IP network (240), obtaining the IP address of the first IP phone (200a) from the packet containing the IP address of the first IP phone (200a) by the measurement instrument (250), or obtaining an IP address of an IP sharing device (220a) when the first IP phone (200a) is connected to a private network, or a hub connected to the private network, identifying interference location by determining whether the interference has occurred on the IP network (240) through first stage loopback between a jitter buffer (201) and the IP network (240) when interference is detected in the previous measuring step of the two-way quality measurement, determining whether the interference has occurred at the jitter buffer (201) through second stage loopback between the jitter buffer (201) and a Digital Signal Processor (DSP) codec (203) when the interference is not detected through first stage loopback, checking the interference occurrence through third stage loopback between the DSP codec (203) and a Plain Old Telephone Service (POTS) network (205) when the interference is not detected through second stage loopback, and performing the quality and interference analysis for the section of the IP network (240) by pinging and trace routing to the IP address obtained at the previous obtaining step when the interference is determined to have occurred on the IP network (240).

* * * * *